Figures 1, 2, 3:
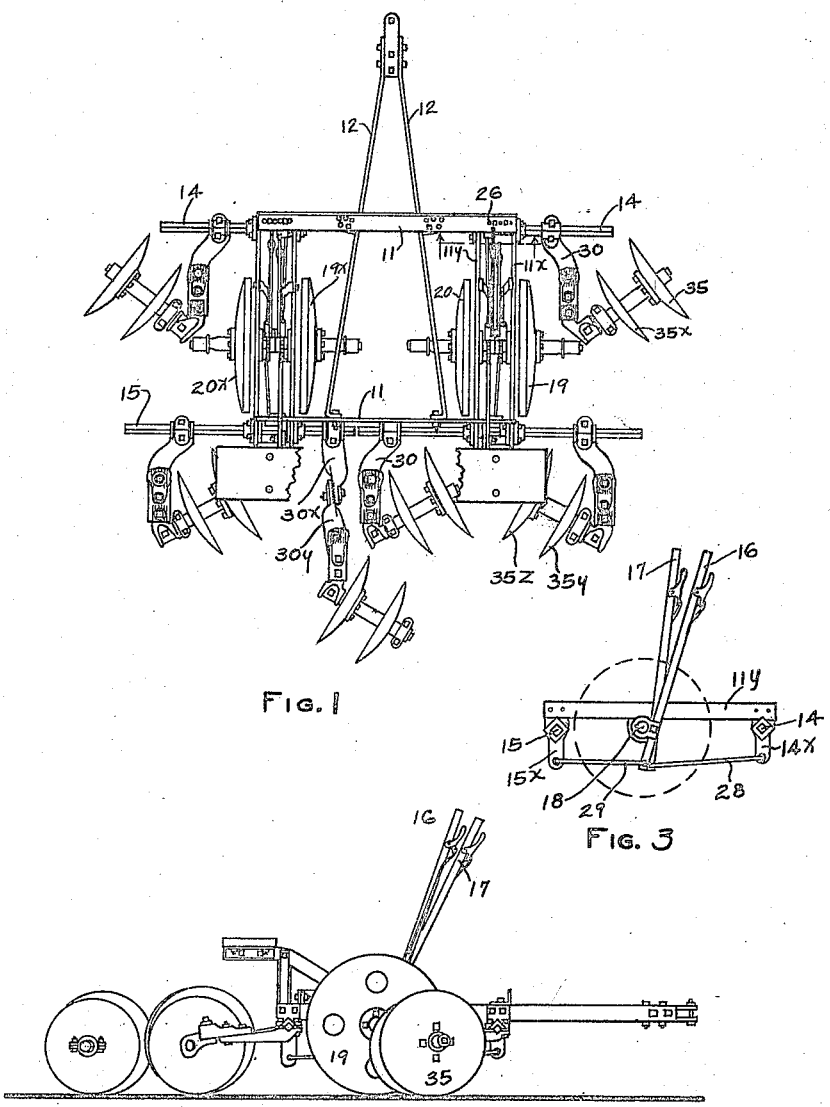

June 12, 1923.  1,458,246

J. SCHERMULY

THREE-ROW RIDGE CULTIVATOR

Filed May 23, 1922    2 Sheets-Sheet 1

Joseph Schermuly
INVENTOR.

BY
U. G. Charles
ATTORNEY.

June 12, 1923.

J. SCHERMULY 1,458,246

THREE-ROW RIDGE CULTIVATOR

Filed May 23, 1922

2 Sheets-Sheet 2

Joseph Schermuly
INVENTOR.

BY
U.G.Charle
ATTORNEY.

Patented June 12, 1923.

1,458,246

UNITED STATES PATENT OFFICE.

JOSEPH SCHERMULY, OF WICHITA, KANSAS.

THREE-ROW RIDGE CULTIVATOR.

Application filed May 23, 1922. Serial No. 563,030.

*To all whom it may concern:*

Be it known that I, JOSEPH SCHERMULY, a citizen of the United States, residing at Wichita, in the county of Sedgwick and State of Kansas, have invented certain new and useful Improvements in a Three-Row Ridge Cultivator, of which the following is a description referring to the drawings that accompany this specification.

Figure 4:
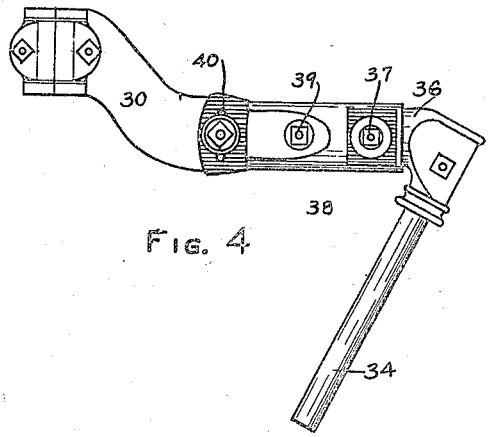
Figure 8:
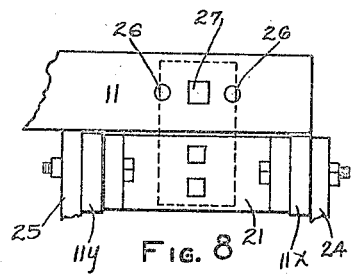
Figure 5:
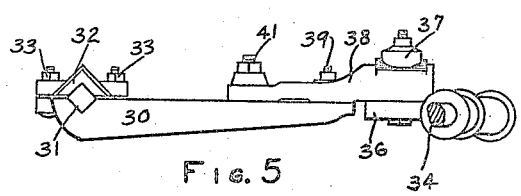
Figure 9:
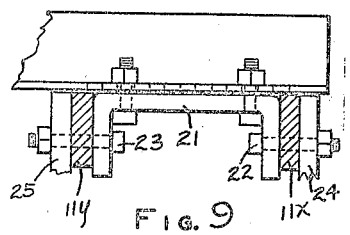
Figure 6:
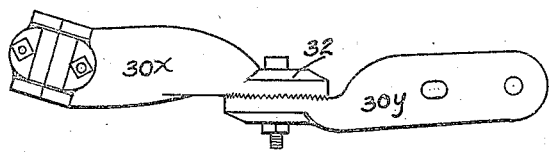
Figure 7:
Figure 10:
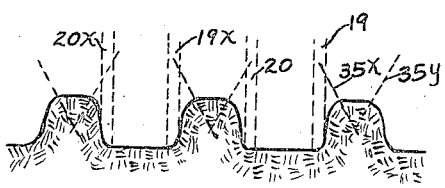

The invention relates to a machine adapted for use by farmers and others. In farming operations known as listing, such for instance as listing corn, Kaffir corn and the like, a ridge alternates with a furrow and when it is desired to level down the field such for instance as when again cultivating the land for sowing wheat or other crops of that character, it has been found a difficult task under the old and customary methods as usually employed. By the use of my machine all ridges are easily and readily cut away and leveled down and the furrows filled and by the later described application of the disc cutting devices, no central portion of the ridge is left standing. In listing operations the ridges frequently are spaced at varied distances apart and a machine that would be operable for ridges of a fixed spaced distance would not necessarily do the work in proper form in another field where the farmer had spaced his ridges further apart. Adjustable features are incorporated in my invention which permit the user to vary the mechanism to accommodate the varied spacing of ridges as found in field conditions. These and sundry other features of the invention will be more fully understood by reference to the accompanying drawings, in which; Fig. 1 represents a plan view of the machine; Fig. 2 shows a right elevation of the machine; Fig. 3 represents a view of the right hand portion of the frame with certain elements removed; Fig. 4 shows a plan view of the adjustable arm carrying a disc spindle; Fig. 5 is a side view of Fig. 4; Fig. 6 illustrates a plan view of an adjustable arm provided also with a vertical adjustment; Fig. 7 is a side view of Fig. 6; Fig. 8 shows a fragmentary portion of the frame construction; Fig. 9 is a front view, partially in section, of Fig. 8; Fig. 10 is a diagram illustrating the position of the elements of the invention in their functional relationship to the ridges and furrows in the field to be cultivated. Similar numerals of reference indicate corresponding parts throughout all the figures of the drawings.

Referring to the drawings, the frame 11 is of angle iron construction substantially forming a rectangle as seen in Fig. 1. A member 12 rigid with the frame 11 connects at 13 to the tractor or other power pulling means. The sides of the frame rectangle are adjustable from or towards the central axis of the frame as will be later described. Rotatably mounted in bearings carried by the forward element of the frame 11 are seen square shaft members 14; similarly square shaft members 15 project outwardly from the rear member of the frame 11. On these shafts 14 and 15 are adjustably arranged the arm members disclosed in Figs. 4, 5, 6, and 7 and as shown in Figs. 1 and 2.

The right hand portion of Fig. 1 will be described, it being understood that the left hand portion is of similar construction reversed in position. It has been previously mentioned that the side portions of the frame rectangle 11 were adjustable. For convenience a side member is composed of two frame portions $11^x$ and $11^y$, thus giving greater stability and allowing the operating levers 16 and 17 to be pivoted on the wheel shaft 18 intermediate the wheels 19, 20 and between the frame portions $11^x$ and $11^y$. The wheels 19, 20 in leveling operations travel in the right hand furrow, Fig. 10, the companion wheels $19^x$ and $20^x$ traveling in the other furrow as illustrated. Preferably a spacing member 21 is introduced between the members $11^x$ and $11^y$; bolts 22, 23 secure the assemblage to the members 24, 25 respectively which support the boxing for the shaft 14 or 15. A plurality of holes as at 26 enable the spacing member 21 to be bolted as at 27 at any spaced distance from or towards the central axis of the frame 11. This occurs likewise with respect to the rear portion of the frame 11 so as to have the side members $11^x$ and $11^y$ in their proper position. This adjustment then places the wheels 19, 20, $19^x$ and $20^x$ at proper spaced distances to follow the channels, Fig. 10.

A crank $14^x$ rigid with the shaft 14 is operable by the connecting rod 28 controlled by lever action 17, similarly lever 16 acts on connecting rod 29, crank $15^x$ to turn the shaft 15 rigid therewith.

Referring to Figs. 4 and 5; an arm 30 having a V-shaped groove at 31 and a cap element 32 grooved in like V-shaped fashion and bolted to said arm 30 is slidably arranged upon the shaft 14 and the bolts 33 drawn tight to fix the arm at a desired position or adjustment thereon; a similar arm is fixed on the shaft 15 in like manner at the outer end thereof. Disc wheels are rotatably mounted on the shaft 34 as at 35, 35ˣ; and it will be noted that they are supported to travel at an angle with respect to the general direction of travel of the wheels 19, 20. Similarly the wheels 35ʸ, 35ᶻ carried on the assemblage in the rear are arranged to travel at an opposite angle and so that the wheels 35ˣ and 35ʸ intersect the central longitudinal axis of the ridge as in Fig. 10 and whereby the ridge is entirely cut away and leveled into the channels adjacent thereto. The shaft 34 is carried by an arm 36 pivotally mounted at 37 to a member 38 pivotally mounted at 39 on the arm 30. The member 38 is slotted at 40 so that a bolt 41 rigid with the arm 30 can permit of some adjustible pivoted movement of the element 38 and the bolt 41 then be tightened to preserve the assemblage. It will thus be understood that the discs 35, 35ˣ, 35ʸ and 35ᶻ are first pivotally adjusted to assume the preferred positions as illustrated in Fig. 1 and outlined in Fig. 10. During travel to and from the field the levers 16 and 17 are operated to turn the shafts 14 and 15 and lift the disc wheels from ground contact. The above combination then provides of the right hand ridge in Fig. 10, while the outer combination of disc wheels and allied elements, similarly operable as just described for the right hand combinations, operate to level the left hand ridge, Fig. 10. On the left hand of shaft 15 is seen another arm 30 and disc wheel assembly, while on the left hand shaft 15 and at the right thereof is shown the arm construction illustrated in Figs. 6 and 7, here shown in two parts 30ˣ and 30ʸ with an adjustable vertical connection at 30ᶻ as readily understood. The arms 30 are thus so adjustable that the disc wheels will properly function as in the Fig. 10 to bust the ridges, and the wheels 19, 20; 19ˣ and 20ˣ properly maintain the machine in its desired direction of travel.

Such modifications may be employed as lie within the scope of the appended claims. Having fully described my invention what I now claim as new and desire to secure by Letters Patent is:

1. In a machine of the class described, a frame including front and rear elements; two sets of side elements, each set comprising a pair of frame elements spaced apart in parallelism and adjustably secured to the said front and rear elements at selected intervals spaced apart; an axle for each set of side elements and wheels supporting the machine revolvably mounted thereon.

2. In a machine of the class described, a frame including front and rear elements; two sets of side elements, each set comprising a pair of frame elements spaced apart in parallelism and adjustably secured to the said front and rear elements at selected intervals spaced apart; an axle for each set of side elements and wheels supporting the machine revolvably mounted thereon; shaft means rotatably mounted and carried by said front and rear frame elements; a lever for each shaft pivoted upon a wheel axle and elements linking said lever to said shaft for transmitting lever movements into shaft rotating movements.

3. In a machine of the class described, a frame including front and rear elements; two sets of side elements, each set comprising a pair of frame elements spaced apart in parallelism and adjustably secured to the said front and rear elements at selected intervals spaced apart; an axle for each set of side elements and wheels supporting said machine revolvably mounted thereon; shaft means rotatably mounted and carried by said front and rear frame elements; a lever for each shaft pivoted upon a wheel axle and elements linking said lever to said shaft for transmitting lever movements into shaft rotating movements; an arm for each forward shaft, a pair of arms for each rear shaft; a spindle adjustably connecting to each arm and disc cutters rotatably mounted on each spindle.

4. In a machine of the class described, a frame including front and rear elements; two sets of side elements, each set comprising a pair of frame elements spaced apart in parallelism and adjustably secured to the said front and rear elements at selected intervals spaced apart; an axle for each set of side elements and wheels supporting said machine revolvably mounted thereon; shaft means rotatably mounted and carried by said front and rear frame elements; a lever for each shaft pivoted upon an axle and elements linking said lever to said shaft for transmitting lever movements into shaft rotating movements; an arm for each forward shaft and adjustably affixed thereupon at desired positions, a pair of arms for each rear shaft and adjustably affixed thereupon; a spindle adjustably secured to each arm and disc cutters rotatably mounted on each spindle.

5. In a machine of the class described, a frame including front and rear elements; two sets of side elements, each set comprising a pair of frame elements spaced apart in parallelism and adjustably secured to the said front and rear elements at selected intervals spaced apart; an axle for each set of side elements and wheels supporting said machine revolvably mounted thereon; shaft means of square cross-section rotatably mounted and carried by said front and rear frame elements; a lever for each shaft pivotally mounted upon an axle element and linking elements connecting intermediate said lever and its shaft for transmitting a lever movement into a shaft rotating movement; an arm for each forward shaft, adjustably sleeved thereupon and selectively affixed thereto; a pair of arms for each rear shaft, adjustably affixed and sleeved thereupon; a spindle for each arm element and disc cutters rotatably mounted thereon; each spindle pivotally connecting through connecting elements to its respective arm element and means for maintaining a fixed pivoted adjustment and whereby each forward set of disc cutters cooperates with a rear set of disc cutters under oppositely directed angular traveling disc rotating movements, while the central pair of rear disc cutter elements cooperate with each other in a similar manner and for the purposes as specified.

JOSEPH SCHERMULY.